(12) United States Patent
Hirano et al.

(10) Patent No.: US 8,335,047 B2
(45) Date of Patent: Dec. 18, 2012

(54) PATTERNED MEDIA WITH OFFSET PES SERVO SEGMENTS WITH LENGTH ENCODED TRACK POSITION

(75) Inventors: Toshiki Hirano, San Jose, CA (US); Jeffrey S. Lille, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 141 days.

(21) Appl. No.: 12/924,881

(22) Filed: Oct. 7, 2010

(65) Prior Publication Data

US 2012/0087036 A1 Apr. 12, 2012

(51) Int. Cl.
*G11B 5/09* (2006.01)
*G11B 5/596* (2006.01)
(52) U.S. Cl. ........................ 360/48; 360/77.08
(58) Field of Classification Search .................. None
See application file for complete search history.

(56) References Cited

U.S. PATENT DOCUMENTS

| | | | |
|---|---|---|---|
| 6,643,082 B1 | 11/2003 | Belser | |
| 7,009,791 B2 | 3/2006 | Shimatani | |
| 7,012,773 B2 | 3/2006 | Ashikaga et al. | |
| 7,612,961 B2 | 11/2009 | Yamamoto | |
| 7,821,738 B2 * | 10/2010 | Ito et al. | 360/135 |
| 2008/0239906 A1 | 10/2008 | Akagi et al. | |
| 2008/0266701 A1 | 10/2008 | Albrecht et al. | |
| 2009/0097160 A1 | 4/2009 | Yamamoto | |
| 2009/0166321 A1 | 7/2009 | Albrecht et al. | |
| 2009/0168229 A1 | 7/2009 | Albrecht et al. | |
| 2010/0128583 A1 | 5/2010 | Albrecht et al. | |
| 2010/0165512 A1 | 7/2010 | Albrecht et al. | |

FOREIGN PATENT DOCUMENTS

| | | |
|---|---|---|
| JP | 2005174429 A1 | 6/2005 |
| JP | 2008204509 A1 | 9/2008 |
| WO | WO2008105334 A1 | 9/2008 |

OTHER PUBLICATIONS

Xiaodong Che, "Study of Lithographically Defined Data Track and Servo Patterns," IEEE Transactions on Magnetics, vol. 43, No. 12, Dec. 2007, pp. 4106-4112.
M. Nishikawa, "Potential of Servo Pattern Printing on PMR Media with High-Density Servo Signal Pattern," IEEE Transactions on Magnetics, vol. 42, No. 10, Oct. 2006, pp. 2612-2614.
M.T. Moneck, "Lithographically Patterned Servo Position Error Signal Patterns in Perpendicular Disks," Journal of Applied Physics 103, 07C511 (2008), 3 pages.
T. Hamaguchi, "An Accurate Head-positioning Signal for Perpendicular Recording Using a DC-free Servo Pattern," Journal of Applied Physics, vol. 91, No. 10, May 15, 2002, pp. 8697-8699.

* cited by examiner

*Primary Examiner* — Regina N Holder
(74) *Attorney, Agent, or Firm* — G. Marlin Knight

(57) ABSTRACT

Patterned discrete track magnetic media compatible with the constraints imposed by the use of self-assembly technology are described in which the PES servo portion of each servo sector has at least one offset segment used for the position error signal (PES). The downtrack length of the PES offset segment systematically varies according to the track position to encode information about the track position usable by the servo system. The downtrack length of the offset segment and, therefore, the time between the corresponding signal shifts is systematically varied from the inner diameter (ID) to the outer diameter (OD) according to the track position to provide coarse information to the servo system even if part of the track ID code cannot be read. Alternative embodiments include a preamble timing mark formed by another offset segment. A self-servo writing method is described using the preamble timing marks.

22 Claims, 6 Drawing Sheets

PATTERNED MEDIA WITH OFFSET PES SERVO SEGMENTS WITH LENGTH ENCODED TRACK POSITION

RELATED APPLICATIONS

This application refers the concepts of the following co-pending, commonly assigned applications. One is by Albrecht, et al. bearing Ser. No. 12/345,799 which has a filing date of Dec. 30, 2008 and was published Jul. 1, 2010 as pub. no. 20100165512. A second one is by Albrecht, et al. bearing Ser. No. 12/324,431 which has a filing date of Nov. 26, 2008 and was published May 27, 2010 as pub. no. 20100128583.

FIELD OF THE INVENTION

This invention relates generally to servo systems for information storage systems that use rotating recording disks with pre-patterned tracks.

BACKGROUND

Commercial magnetic disk drive areal densities now exceed 300 Gbits/sq. in., and track densities can be greater than 250,000 tracks per inch. Advanced servo techniques are required to further improve disk drive performance. At the needed track densities, the heads (sensors) must stay centered on the narrow tracks to within a tolerance on the order of a nanometer as the disk rotates under the heads at thousands of rpm. The servo fields, which encode positional information, are permanently written onto the disk during the manufacturing process. The servo information is processed by an electronics control system that adjusts the physical position of the actuator on which the heads are mounted.

The process by which the position information is written onto the disks is referred to as servo writing. Conventionally servo writing has been performed by a dedicated device called a servowriter that is distinct from the disk drive itself. Another approach is have the disk drive heads write the servo information, which is called self-servo writing.

Conventional magnetic disks have continuous thin films in which the magnetic transitions are recorded, but one technique for improving areal densities is to pattern the films into discrete track media (DTM) in which the tracks are formed from continuous strips (concentric rings) of magnetic material separated by small gaps where the magnetic material has been removed. More recently bit-patterned media (BPM) have been proposed that use nanometer scale magnetic islands or dots arranged in tracks on the recording surface. DTM and BPM place constraints on servo pattern design, because arbitrary features may not be compatible with the appropriate fabrication methods, and required servo patterns may be more complex than the data patterns. For example, planarization constraints might require that all pre-patterned features are constructed of grooves and lands with common dimensions (i.e., servo patterns have the same land and groove dimensions as data tracks). The planarization constraint allows grooves to vary in orientation and absolute position, provided land and groove dimensions are generally fixed.

Patterned media is typically fabricated using nanoimprint lithography (NIL), which mechanically deforms the imprint resist to create patterns. A master template is used to fabricate a plurality of stamper tools that are then used for imprinting the substrates for the patterned media. The required servo patterns must be included in the master template. One method of fabricating patterned media templates grows self-assembly structures on top of a lithographically-defined template. For example e-beam lithography can be used to etch a matrix of holes in a master mold substrate. After the e-beam patterning, block copolymer self-assembly can be used to improve the uniformity of the e-beam dots and to fill-in missing dots. Self-assembled structure fills in the gaps as the self-assembled polymer minimizes the energy of the system.

The servo data on the disk provides several fundamental functions and is conventionally arranged in distinct fields that are arranged in sequence in each servo sector along the direction of the track. First, it supplies a synchronizing timing mark (known as the Servo Track Mark (STM) or Servo Address Mark (SAM)). Next is a 10-30 bit digital field, which provides an integer track-ID (TID) number and additional information to identify the physical servo sector number. The TID is typically written in Gray code as the presence or absence of recorded dibits. During seek operations, when the head is rapidly moving across tracks, the head can typically only read a portion of the Gray-code in each TID. The Gray-code is constructed so that pieces of the TID, in effect, can be combined from adjacent tracks to give an approximate track location during a seek. The servo field also includes a position error field, which provides the fractional-track Position Error Signal (PES). During read or write operations the drive's servo control system uses the PES servo information recorded on the disk surface as feedback to maintain the head in a generally centered position over the target data track. The conventional PES pattern is called a quad-burst pattern in which the bursts are identical sets of high frequency magnetic flux transitions. Unlike the track-ID (TID) field number, the PES bursts do not encode numerical information. In contrast to the TID, it is the position of the bursts that provide information on where the head is relative to the centerlines of adjacent tracks. The quad-burst pattern is repeated for each set of two tracks, so only local (fractional) information is provided. Each servo wedge has four (A,B,C,D) sequential slots reserved for PES bursts. Each track has a centered PES burst in only one of the four slots. Thus, when the head is centered over a selected track, it will detect the strongest signal from a burst centered on the selected track, but it will also detect a weaker signal from bursts on the adjacent tracks. For example, when the head is centered over a track with a burst in the A-position, it might also detect a subsequent weak B-burst on the adjacent track on the right and then a weak D-burst from the adjacent track on the left. When the head passes over the PES pattern, the bursts that are within range generate an analog signal (waveform) that indicates the fractional position of the head over the disk and is used as feedback to adjust the position of the head. As the term "servo wedge" suggests, the downtrack dimension of the servo sectors increases toward the OD, because the linear velocity increases from the ID to the OD. This allows servo frequency to be keep constant. However, no information about the relative position of the track (the track ID) is encoded in the PES prior art.

Published US patent application 20100165512 by Albrecht et al. (Jul. 1, 2010) describes a method for forming a master pattern for patterned media, including features to support servo patterns. Block copolymer self-assembly is used to facilitate the formation of a track pattern with narrower tracks. The tracks include regions within each servo sector where the tracks are offset radially by a fraction of a track pitch, e.g. one half track. As one example, the offset portion of servo sector is self-written with A and B patterns on alternating tracks and a non-offset portion is self-written with C and D patterns on alternating tracks. The A-D patterns are magnetized in a self-servowrite operation, wherein the write head writes a burst (e.g., typically square wave) of alternating magnetization polarities.

Published US patent application 20100128583 by Albrecht; et al. (May 27, 2010) describes a servo writing method for patterned-media magnetic recording disk that uses a special position error signal (PES) alignment pattern located in each servo sector. The servo sectors include a synchronization (sync) field and a PES field that may include burst fields (A-D). The A-B fields are shown as being radially shifted by one-half track from the dots in fields C-D. The set of radial offsets for all of the servo sectors is used to modify or fine tune the gross feedforward correction signal that is applied during the servo writing process. This enables the servowriter write head to then precisely follow a track centerline so that the discrete islands in the PES fields can be magnetized according to the desired pattern.

Published US patent application 20090166321 by Albrecht, et al. (Jul. 2, 2009) describes formation of servo patterns for magnetic media that include self-assembly structures. The servo pattern is defined through lithographic processes while the data pattern is defined by a combination of lithographic processes and self-assembly. The servo regions may each include a sync field and plurality of burst fields (A-D), which in FIG. 3 are shown as including offset portions with the islands (dots) for the A and B bursts being generally positioned one half track offset from the respective track centerline. The A and B bursts are offset one track width from each other as well as being sequentially separated.

Published US patent application 20090097160 by Yamamoto (Apr. 16, 2009) describes a magnetic recording disk with pre-patterned servo sectors, wherein each data bit is stored in a magnetically isolated data island on the disk. The servo sectors include a synchronization pattern of generally radially directed discrete magnetized marks, and first and second position error signal (PES) fields of generally radially directed discrete magnetized stripes. Each stripe in each of the two fields comprises a plurality of radially spaced discrete servo islands.

Published US patent application 20090168229 by Albrecht, et al. describes a method of fabricating servo sectors of a patterned storage media with two arrays of discrete islands in a servo sector. The first array defines at least two burst fields. The second array also defines at least two burst fields. The second array is formed with a track-wise offset (i.e., an offset in the radial direction) from the first array. The offset between the first array and the second array may be about a half track offset, but the amount of offset between the arrays may vary depending on design preferences. Another step of the method comprises performing a servo writing process to define the polarity of the islands in the arrays. The servo writing process is performed by circumferentially writing one or more rows of islands to define the servo pattern in the servo sector. The servo pattern may be burst fields, sync fields, etc. The servo pattern generated by the servo writing process allows a quadrature signal to be generated when a read/write head passes over a track of the patterned storage media.

In U.S. Pat. No. 6,643,082 to Karl Belser (Nov. 4, 2003) a servo sector format for patterned media is described that includes a first patterned servo timing mark, a patterned Gray code, a plurality of PES burst separators (where no data can be written), and a second patterned servo timing mark. The first patterned servo timing mark indicates the start of a servo sector. A plurality of servo burst fields are written magnetically between the plurality of PES burst separators, and are used to determine at least one position error signal. The servo sector format further includes magnetically written Gray code positioned after the second servo timing mark. The patterned Gray code is used in addressing the tracks located on the surface of a disk when the magnetically written Gray code is self-written.

SUMMARY OF THE INVENTION

Embodiments of the invention describe patterned discrete track magnetic media comprising concentric tracks in which the PES servo portion of each servo sector has at least one offset portion used for the position error signal (PES). The offset can be half of a track pitch, for example. The invention is compatible with the constraints imposed by the use of self-assembly technology in fabricating the thin film magnetic media. In embodiments of the invention the downtrack length of the PES offset portion systematically varies according to the track position to encode information about the track position usable by the servo system. In one embodiment the servo system writes selected PES signal patterns on the offset and non-offset portions that are different on adjacent tracks to provide fractional track position information.

The PES offset portion results in two sensor signal shifts (one at the front of the offset portion and one at the end) as the disk rotates under the sensor. The downtrack length of the offset portion and, therefore, the time between the signal shifts is systematically varied from the inner diameter (ID) to the outer diameter (OD) according to the track position to provide coarse information to the servo system even if the track ID code cannot be read.

In an alternative embodiment another offset segment is used as a preamble timing mark. In one embodiment each servo sector would include a preamble timing mark offset segment followed the track ID, for example a Gray code, followed by the PES section which includes an offset portion.

In another embodiment an additional offset portion is used for a redundant track ID in each servo sector. In this embodiment a first track ID is written in an non-offset portion of the track and a second track ID is written in an offset portion. Having two track IDs that are offset by half a track, for example, increases the likelihood of success in reading the track ID.

In yet another alternative embodiment using redundant track IDs, each track ID is paired with a PES signal. For example, a non-offset portion of the track could include the first track ID followed by a PES-A signal and an offset portion could include the second track ID followed by a PES-B signal.

A method is described for self-servo writing patterned media according to the invention described above. The magnetic media on the disks is uniformly magnetized prior to self-servo writing; and a trail and error method is used to write the first track servo data based on known length and timing of signals from a DC magnetized media.

DETAILED DESCRIPTION OF THE INVENTION

Figure 9:
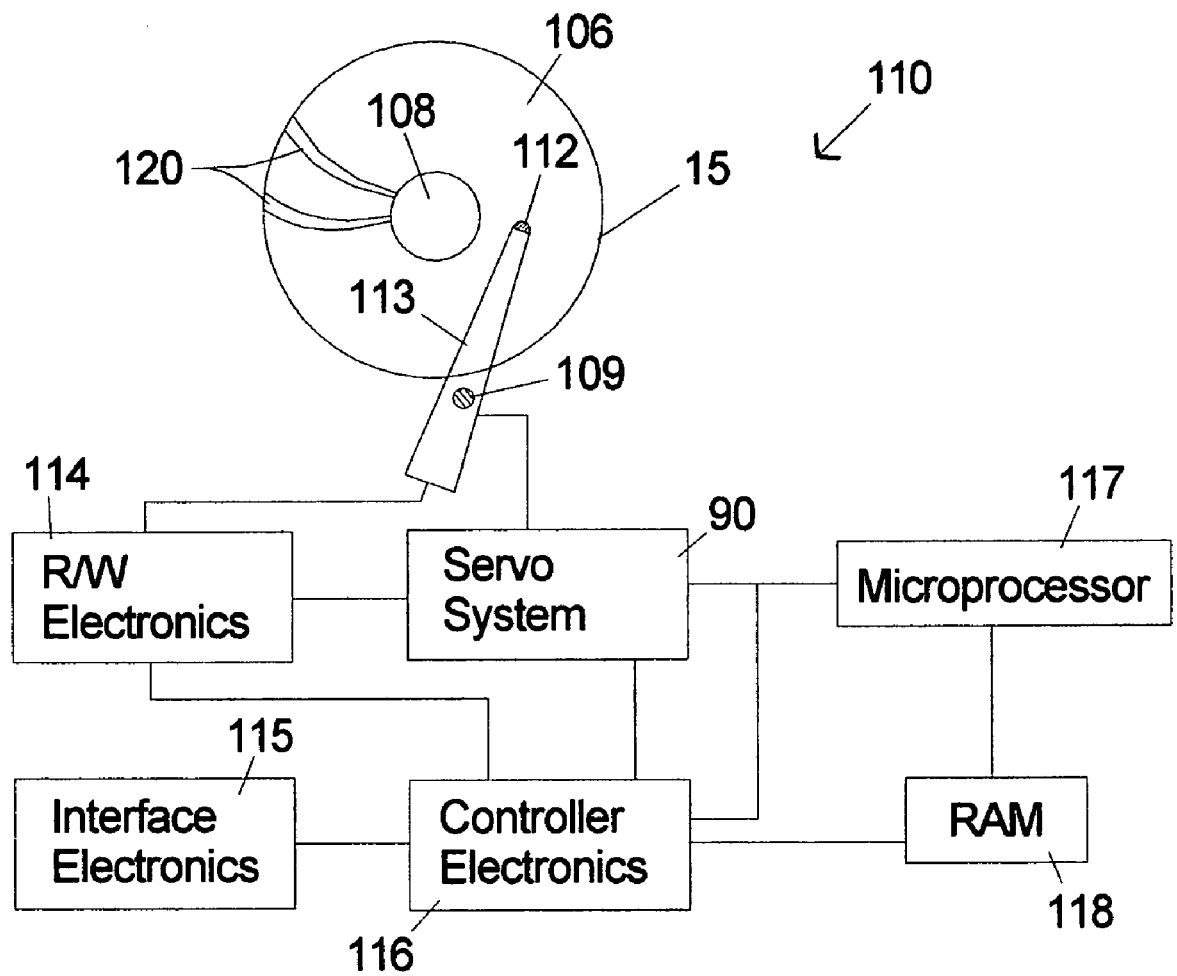
FIG. 9 is a block diagram illustrating selected components of an information storage system (disk drive) according to prior art in which the invention can employed.

The invention can be implemented in an information storage system (disk drive) that uses rotating disks coated with patterned thin film magnetic materials and can be used for DTM or BPM. The basic system components of the disk drive are generally according to the prior art except as described herein. FIG. 9 is a block diagram illustrating selected components of an information storage system (disk drive) 110 according to prior art in which the invention can employed. The disk drive includes data recording disk 15 on which thin film ferromagnetic materials 106 have been patterned into discrete tracks (not shown). As in prior art practice a disk drive can contain multiple disks and sliders, but only one is shown. Actuator arm 113 is mounted to pivot around mounting point 109 by being driven conventionally by a voice coil motor (VCM) (not shown). Slider 112, which contains the read head (sensor) and write head (not shown), is attached to actuator arm 113. The electronics in the disk drive include servo system 90, read/write electronics 114, interface electronics 115, controller electronics 116, microprocessor 117, and RAM 118. A disk drive can include multiple disks stacked on hub 108 that is rotated by a disk motor (not shown), with a separate slider for each planar surface of each disk. The term servo wedge 120 will be used to mean the set of servo fields extending from ID to OD on the disk. As in the prior art, a disk 15 according to the invention will typically have multiple servo wedges 120 periodically arranged around the disk, but only two are shown. The data fields on each track extend between the servo sectors.

One problem for designing a servo systems for patterned media with self-assembled features is that conventional low order Grey code used for track IDs has asymmetric features that may not be compatible with self-assembled features on patterned media. One consequence is that servo systems that are adapted to the constraints of self-assembly may not be able to read the track IDs during seeks as well as conventional systems. Therefore, additional means for providing information about the approximate (coarse) track location of the read sensor are needed. Embodiments of the invention provide this additional information by systematically varying the length from ID to OD of a PES segment that is offset from the track centerline by a fraction of the track pitch, e.g. one half. The downtrack length of the offset portion and, therefore, the time between the signal shifts caused by the offset, is systematically varied from the inner diameter (ID) to the outer diameter (OD) according to the track position to provide information to the servo system even if the track ID code cannot be read.

The exact track position resolution will depend on the timing resolution of the circuitry. The servo section downtrack length can vary from ID to OD on the order of 2× due to the doubling of the radius from ID to OD on typical disks.

Within this 2× range, the precision of the measurement of the timing between signal shifts will limit the resolution of the track position mapping. There are also a mechanical factors that come into play as the slider has to seek at relatively high rate, then settle before trying to read a particular track. The servo system then determines whether or not the position is off track (by a half track) where it will have no signal or some signal from both adjacent tracks. This will result in sampling several servo sectors to collect a signal that has an acceptable SNR and frequency distribution. For example, in a practical embodiment using current technology, the servo electronics should be able to map the signal to a track position with an error band of no more than 100 tracks. This depends on the electronic bandwidth of the read sensor (which is on the order of a GHz), and the mechanical bandwidth of the servo system, which is on the order of 10 kHz.

The offsets in the track result in induced grain boundaries at least two breaks in the downtrack symmetry per servo sector. Because of edge effects of an induced shift at the ID and OD of the disk, no recording should be done on the extreme tracks.

Figure 1A:
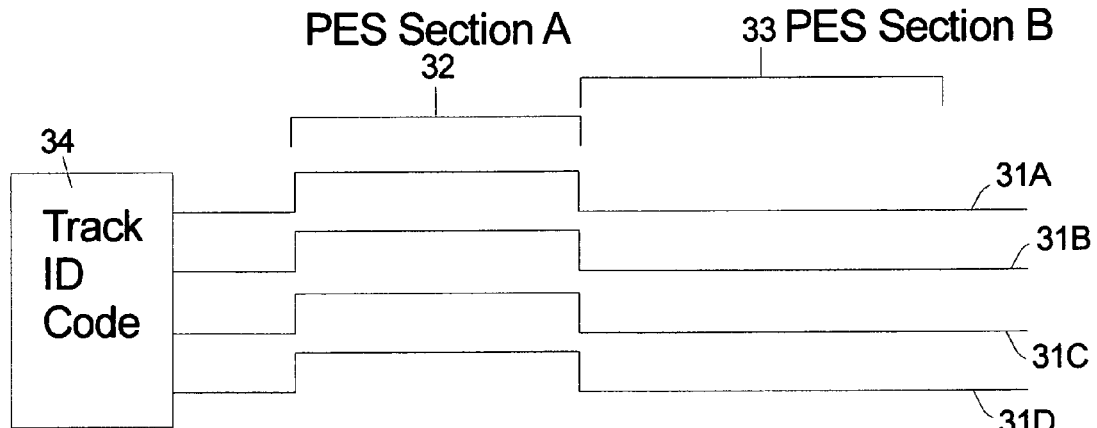
FIG. 1A is an illustration of PES sections of tracks on a patterned disk according to an embodiment the invention.

FIG. 1A is an illustration of selected PES sections of tracks 31A-D on a patterned disk according to an embodiment the invention. The patterns of the alternating lines can be formed using standard techniques such as e-beam lithography followed by the formation of self assembly structures that fill in the gaps (and minimize the energy of the system). For simplicity the tracks in each of the figures are shown as being solid continuous lines, but the media can be bit-patterned where the tracks are formed from islands or dots of magnetic material in concentric rings. The offset segments in FIGS. 1A, 1B and other figures are shown as having square transitions, but the actual geometry in a practical embodiment will be more gradual as shown in FIG. 2, for example. Each of the figures showing sections of the tracks would move (rotate) under the sensor from right to left. As shown the sensor flying over the rotating disk would first encounter the track ID code 34, then the PES sections 32, 33 which would be followed by the data area. Each servo sector includes a offset portion which serves as the PES-A 32. The offset portion is shifted by a fraction of the track pitch, for example, one half of the track pitch. The PES-B section 33 follows the PES-A 32. The two PES sections can have different lengths.

Figure 1B:
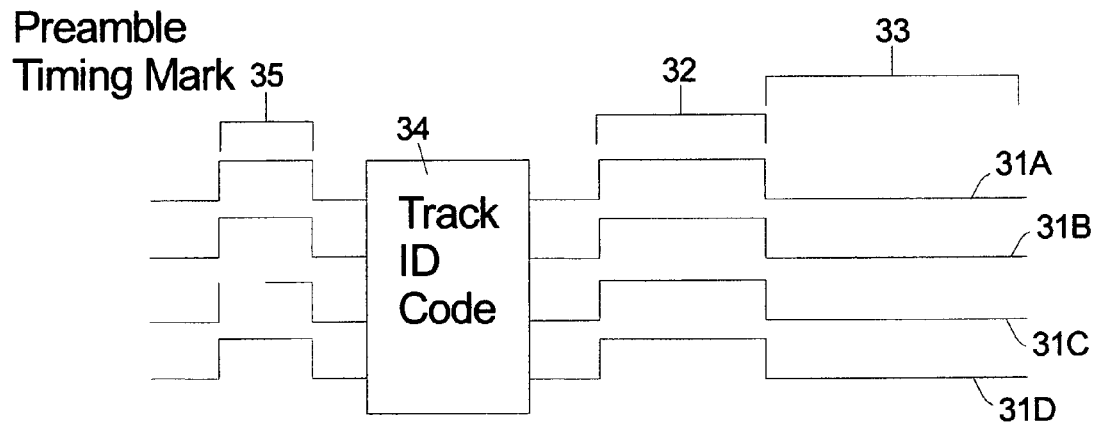
FIG. 1B is an illustration of servo section of tracks on a patterned disk according to an embodiment the invention that includes a preamble timing mark.
Figure 2:
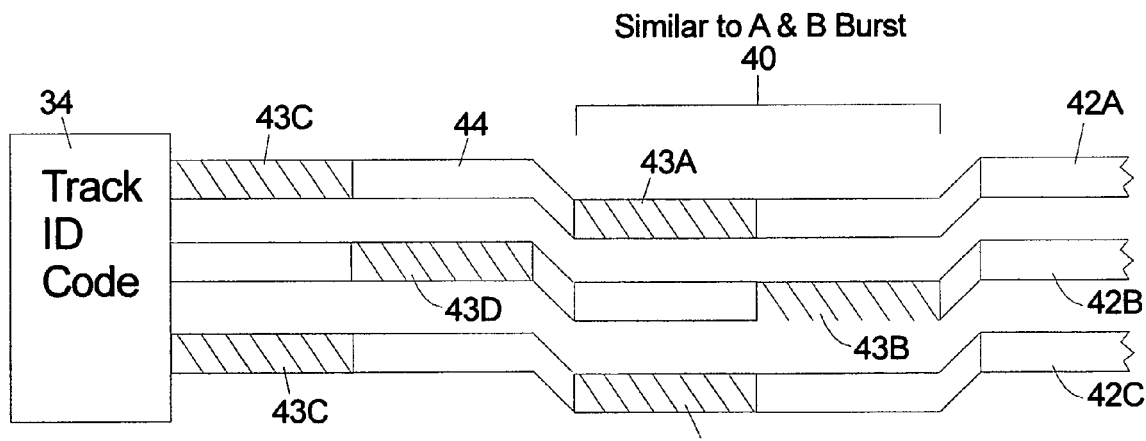
FIG. 2 is an illustration of PES signals written on servo sections of tracks on a patterned disk according to an embodiment the invention.

FIG. 1B is an illustration of servo sections of tracks on a patterned disk according to an embodiment the invention that includes an offset segment used as a preamble timing mark 35 located ahead of the track ID code 34. A timing mark 35 may be needed during self-servo write to start the read/write of the downtrack PES section. The length of the timing mark offset should be different than the PES signals (bursts) length to allow the two sections to be easily distinguished. The length of the preamble timing mark 35 could be scaled with radii to preserve the constant frequency for the servo structures.

FIG. 2 is an illustration of PES sections of tracks on a patterned disk according to an embodiment the invention that includes self-written PES servo signals. In this embodiment tracks 42A-C have the PES servo signals 43A-D self-written in half steps in the PES section. The first half of the offset portion 40 of track 42A has been written with a selected signal pattern 43A. The second half of the offset portion 40 of adjacent track 42B has been written selected signal pattern 43B. Similarly the non-offset portion of alternating tracks are self-servo written with selected signal patterns 43C and 43D as shown. Adjacent tracks have the two PES signals occurring at different times so that the servo can distinguish the burst-like signals from adjacent tracks. Embodiments of the invention could implement A,B, C and D portions of the PES similarly to the convention quad-burst PES. But another possible PES scheme uses only A and B where $(A-B)/(A+B)$ =PES. The self-servo written content of the PES signal is read with a high band pass filter to only register the AC signals. Symmetry is broken by self servo write portions of the offset lines at either DC or different AC frequencies.

Figure 3:
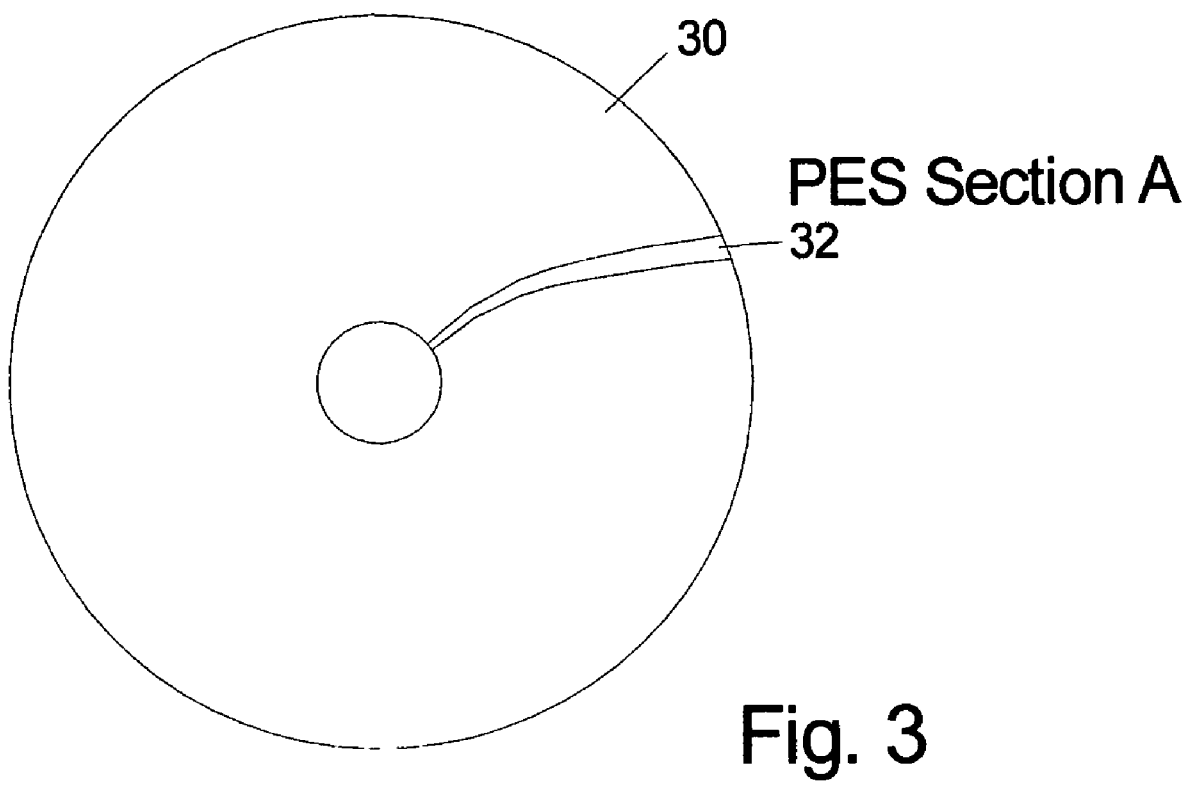
FIG. 3 is an illustration of systematically varying length from ID to OD of the PES offset portion of the PES section in servo sections of tracks on a patterned disk according to an embodiment the invention.

FIG. 3 is an illustration of systematically varying the length from ID to OD of the PES section A 32 in an offset portion in servo sections of tracks on a patterned disk 30 according to an embodiment the invention. Only the PES-A portion of one servo wedge is shown, but the disk will have a plurality of servo wedges arranged periodically around the disk. The downtrack length of the offset portion and, therefore, the time between the signal shifts that occur at the beginning and end of the offset, is systematically varied from the inner diameter (ID) to the outer diameter (OD) according to the track position to provide information to the servo system even if the track ID code cannot be read.

Figure 4A:
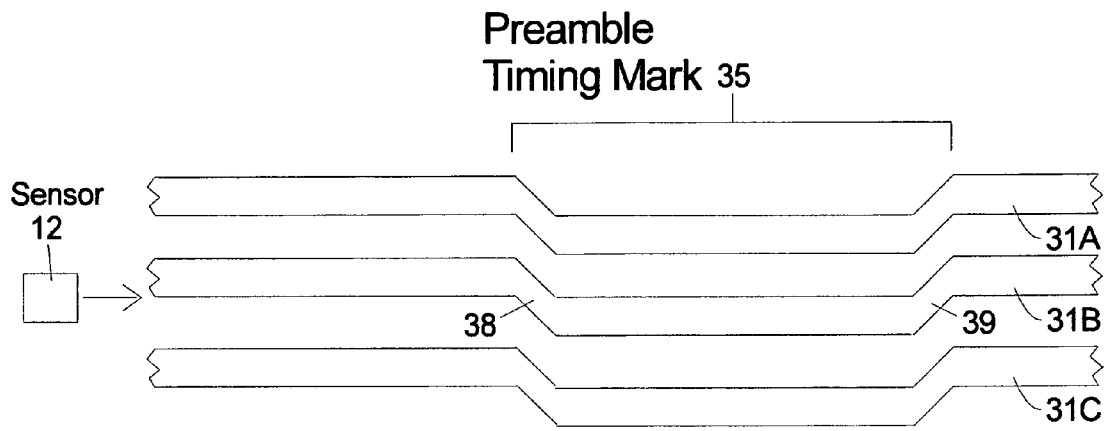
FIG. 4A illustrates a selected path of a sensor in relation to a set of tracks having a preamble timing mark.
Figure 4B:
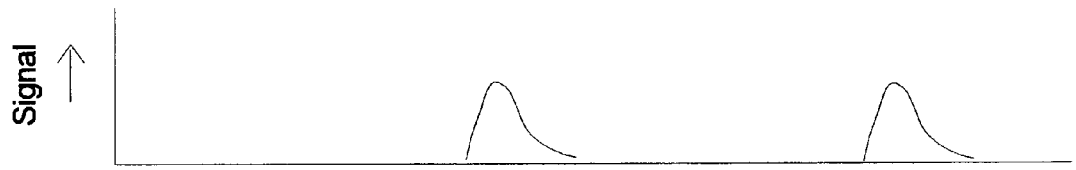
FIG. 4B illustrates a signal from a sensor traveling the path illustrated in FIG. 4A.

Reference is made to FIGS. 4A, 4B, 5A, 5B, 6A and 6B which will be used to illustrate the use of the timing mark in writing the first PES section during self-servo writing. The pairs of figures illustrate a possible path of a sensor (and the resulting signal) in relation to a selected set of tracks having a preamble timing mark. The three different sensor paths generate unique signal patterns which allows the servo system to distinguish the relative position of the sensor in these cases. FIG. 4B illustrates a signal from a sensor traveling the path illustrated in FIG. 4A and so forth. In FIG. 4A the sensor 12 is following a path centered on the lower edge of track 31B. When the sensor passes over the transition region 38 that begins the preamble timing mark 35, the first signal pulse shown in FIG. 4B is generated. Similarly the second signal pulse is generated when the sensor passes over the transition region 39 at the end of the preamble timing mark 35.

Figure 5A:
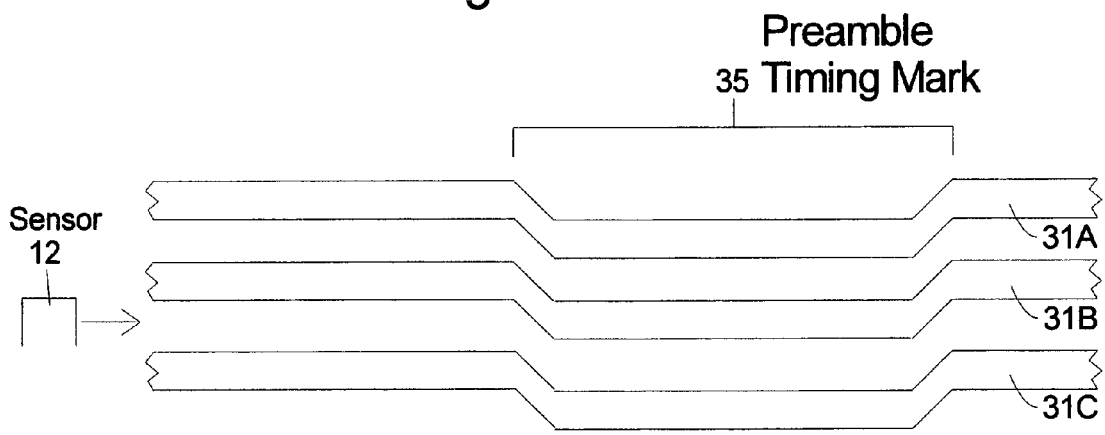
FIG. 5A illustrates a selected path of a sensor in relation to a set of tracks having a preamble timing mark.

In FIG. 5A the sensor path is centered on the preamble timing mark offset portion and, therefore, the sensor signal ramps up when the preamble timing mark 35 is encountered and stays up until the end of the preamble timing mark.

Figure 6A:
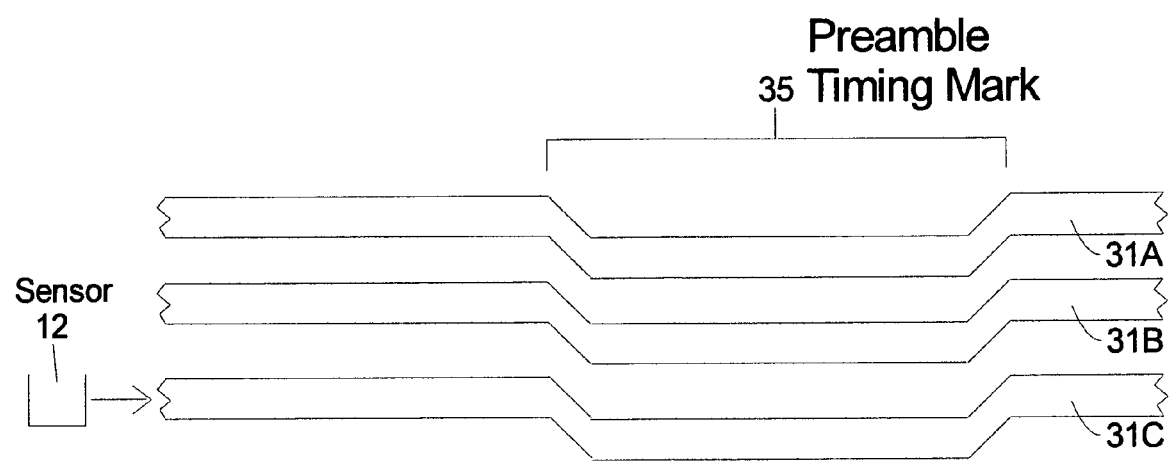
FIG. 6A illustrates a selected path of a sensor in relation to a set of tracks having a preamble timing mark.
Figure 6B:
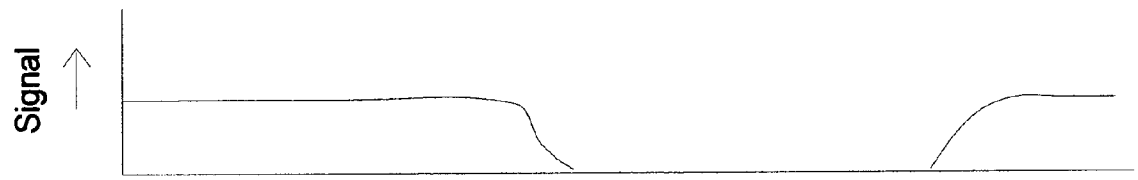
FIG. 6B illustrates a signal from a sensor traveling the path illustrated in FIG. 6A.

In FIG. 6A the sensor path is centered on the non-offset portion of track 31C and, therefore, the sensor signal ramps down when the preamble timing mark 35 is encountered and stays down until the end of the preamble timing mark.

In the trial and error process of initiating self-servo writing a combination of these signals would be collected before the servo was written to gauge the position of the sensor (and therefore, indirectly the write head). The track ID code 34, 34A is written on the track centerline when servo system detects that sensor is traveling on the path indicated by the signal in FIG. 6B. The self-servo writing system detects when the sensor is traveling past (adjacent to) the preamble timing mark offset portion to trigger subsequent writing of the track ID code on a non-offset servo field segment.

Figure 5B:
FIG. 5B illustrates a signal from a sensor traveling the path illustrated in FIG. 5A.

The first PES section would be written and reread (with multiple attempts) when the timing signal looked like the signal in FIG. 5B indicating that the sensor was aligned with the offset of the preamble timing and, therefore, was also aligned with the offset portion of the PES section. Thus, the self-servo writing systems detects when the sensor is traveling centered over the preamble timing mark offset portion centerline to trigger subsequent writing of a PES signal on the offset servo field portion.

The preamble timing signal will be constant for a preset time determined by the length of the offset and the linear velocity, and the PES section should be written after the trailing edge of the preamble timing signal. Other signals that do not match the shape of the PES signal would be filtered and create a write-inhibit situation to avoid writing in an incorrect position. Successfully reading back the full PES signal confirms success. Multiple attempts to write the first PES section and subsequent servo fields add to the time required for self-servo writing. The trial and error process for the first self-servo write operation can start at either the ID or OD. Once the first track has been mapped and confirmed, self-servo writing the subsequent tracks can proceed with greater efficiency.

One characteristic of patterned disks made using a master mold is that repeatable runout (RRO) is the same for all disks and can be mapped and known in advance by the self-servo writing system.

Figure 7:
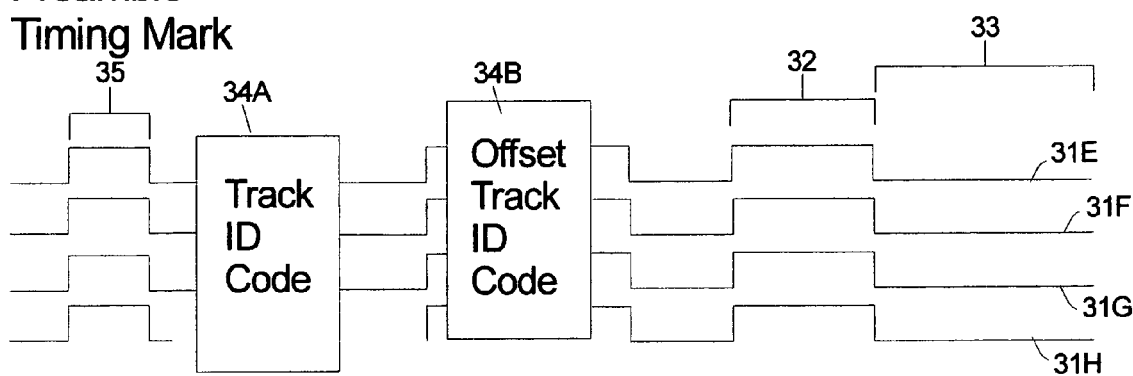
FIG. 7 is an illustration of the servo section of tracks on a patterned disk according to an embodiment the invention that includes a redundant track ID written in an offset portion of the track.

In another embodiment of the invention an additional offset portion is used for a redundant track ID in each servo sector. FIG. 7 is an illustration of the servo section that includes a second, redundant offset track ID code 34B. In this embodiment a first track ID code 34A is written in an non-offset portion of the track and a second offset track ID code 34B is written in an offset portion. Having two track IDs that are offset by half a track pitch, for example, increases the likelihood of success in reading the track ID and could reduce seek and settle time. In the embodiment of FIG. 7, the PES-A section 32 is offset and the PES-B section 33 is not offset.

Figure 8:
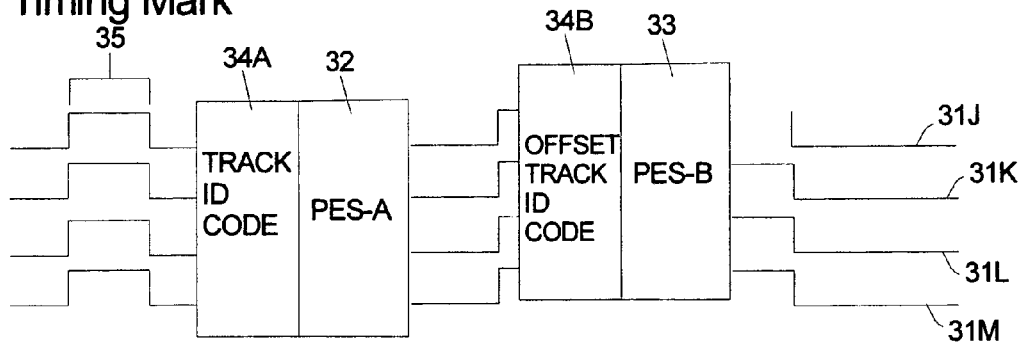
FIG. 8 is an illustration of the servo section of tracks on a patterned disk according to an embodiment the invention that includes a redundant track ID written in an offset portion of the track where the second PES signal is written adjacent to redundant track ID in the offset portion of the track.

FIG. 8 is an illustration of another embodiment of the invention that includes a redundant track ID written in an offset portion of the track. However, in this embodiment the first track ID code 34A and the PES-A section 32 are written sequentially in an non-offset portion of the track. The second track ID code 34B and the PES-B are written sequentially in an offset portion of the track.

In each of the embodiments where PES-A and PES-B are shown, a quad PES system may be used as well. However, increased redundancy in the PES signals slightly reduces that the data capacity of the drive.

While the present invention has been shown and described with reference to particular embodiments, the invention is limited in scope only as specified in the appended claims.

The invention claimed is:

1. A disk drive comprising:
a slider including a read sensor and a write head;
a servo system; and
a rotatably mounted disk accessible by the read sensor and the write head, the disk having a set of concentric, discrete tracks formed from thin film magnetic material separated by areas having no magnetic material, each track in the set including a plurality of servo sectors having at least a first offset servo field portion; a centerline of the first offset servo field portion being offset from a track centerline and wherein a downtrack length of the first offset servo field portion systematically varies according to the track position to provide information about the track position through the read sensor to the servo system, and
wherein the first offset servo field portion results in a first shift in the read sensor signal at a front of the first offset servo field portion and a second shift in the read sensor signal at an end of the first offset servo field portion as the disk rotates under the sensor and the servo system uses a time between the first and second shifts as an indication of the track position.

2. The disk drive of claim 1 wherein the discrete tracks include islands of magnetic material.

3. The disk drive of claim 1 wherein the servo sectors include, a preamble timing mark segment in each discrete track in the set having a centerline offset from a track centerline, and wherein the preamble timing mark segment provides a timing signal to the servo system.

4. The disk drive of claim 3 wherein a length of the preamble timing mark segment is different than a length the first offset servo field portion and the servo system includes means for distinguishing a signal generated by the preamble timing mark segment from a signal generated by the first offset servo field portion.

5. The disk drive of claim 3 wherein the servo system includes means for using the preamble timing mark segment in a self-servo writing process to detect when the read sensor is traveling over the track centerline.

6. The disk drive of claim 3 wherein the preamble timing mark segment is circumferentially aligned with the first offset servo field portion and the servo system includes means for detecting when the read sensor is traveling over the preamble timing mark segment.

7. The disk drive of claim 3 wherein the servo sectors include a first track ID code written on the track centerline and a second track ID code written on an offset portion of the track.

8. The disk drive of claim 3 wherein the servo sectors include a first track ID code followed by a first PES signal written on the track centerline and a second track ID code followed by a second PES signal written on an offset portion of the servo sector.

9. A disk comprising: a set of concentric, discrete tracks formed from thin film magnetic material separated by areas having no magnetic material, each track in the set including a plurality of servo sectors having at least a first offset servo field portion; and wherein a centerline of the first offset servo field portion is offset from a track centerline and a downtrack length of the first offset servo field portion systematically increases from an inner diameter to an outer diameter of the disk according to the track position and thereby encodes information about the track position between the inner diameter and the outer diameter.

10. The disk of claim 9 wherein the discrete tracks are formed from islands of magnetic material.

11. The disk of claim 9 wherein the servo sectors include a preamble timing mark segment in each discrete track in the set having a centerline offset from a track centerline, and a first track ID code written on the track centerline.

12. The disk claim 11 wherein a length of the preamble timing mark segment is different than a length the first offset servo field portion.

13. The disk claim 11 wherein the preamble timing mark segment is circumferentially aligned with the first offset servo field portion.

14. The disk of claim 11 wherein the first track ID code is written on the track centerline and the servo sectors include a second track ID code written on an offset portion of the servo sector.

15. The disk of claim 11 wherein the first track ID code is followed by a first PES signal written on the track centerline and the servo sectors include a second track ID code followed by a second PES signal written on an offset portion of the servo sector.

16. The disk of claim 11 wherein the first offset servo field portion contains a first area written with a PES signal and a second area without a PES signal.

17. A method of operating a disk drive comprising:
detecting a sensor position in relation to centerlines of a DC magnetized discrete track on a disk by distinguishing at least first and second sensor paths based on signals generated by the sensor traveling over or adjacent to a preamble timing mark segment of a servo sector, the preamble timing mark segment being offset from a centerline of the track and being formed from thin film magnetic material which is DC magnetized, the first path corresponding to the sensor traveling over the centerline of the track and being detected by a drop in the signal as the sensor passes by the preamble timing mark segment; the second path corresponding to the sensor traveling over the centerline of the preamble timing mark segment and being detected by an increase in the signal as the sensor passes over the preamble timing mark segment; and
writing a PES signal on an offset portion of the servo sector a selected time after detecting the preamble timing mark segment when the sensor is traveling on the second path.

18. The method of claim 17 further comprising writing a first track ID code on a segment of the servo sector on the track centerline a selected time after detecting the preamble timing mark segment when the sensor is traveling on the first path.

19. The method of claim 18 further comprising writing a second track ID code on an offset portion of the servo sector a selected time after detecting the preamble timing mark segment when the sensor is traveling on the second path.

20. The method of claim 17 further comprising writing a PES signal on a segment of the servo sector on the track centerline a selected time after detecting the preamble timing mark segment when the sensor is traveling on the first path.

21. The method of claim 18 further comprising writing a second PES signal on an offset segment of the servo sector a selected time after detecting the preamble timing mark segment when the sensor is traveling on the second path.

22. The method of claim 17 wherein the media is bit-patterned.

* * * * *